Figure 2:
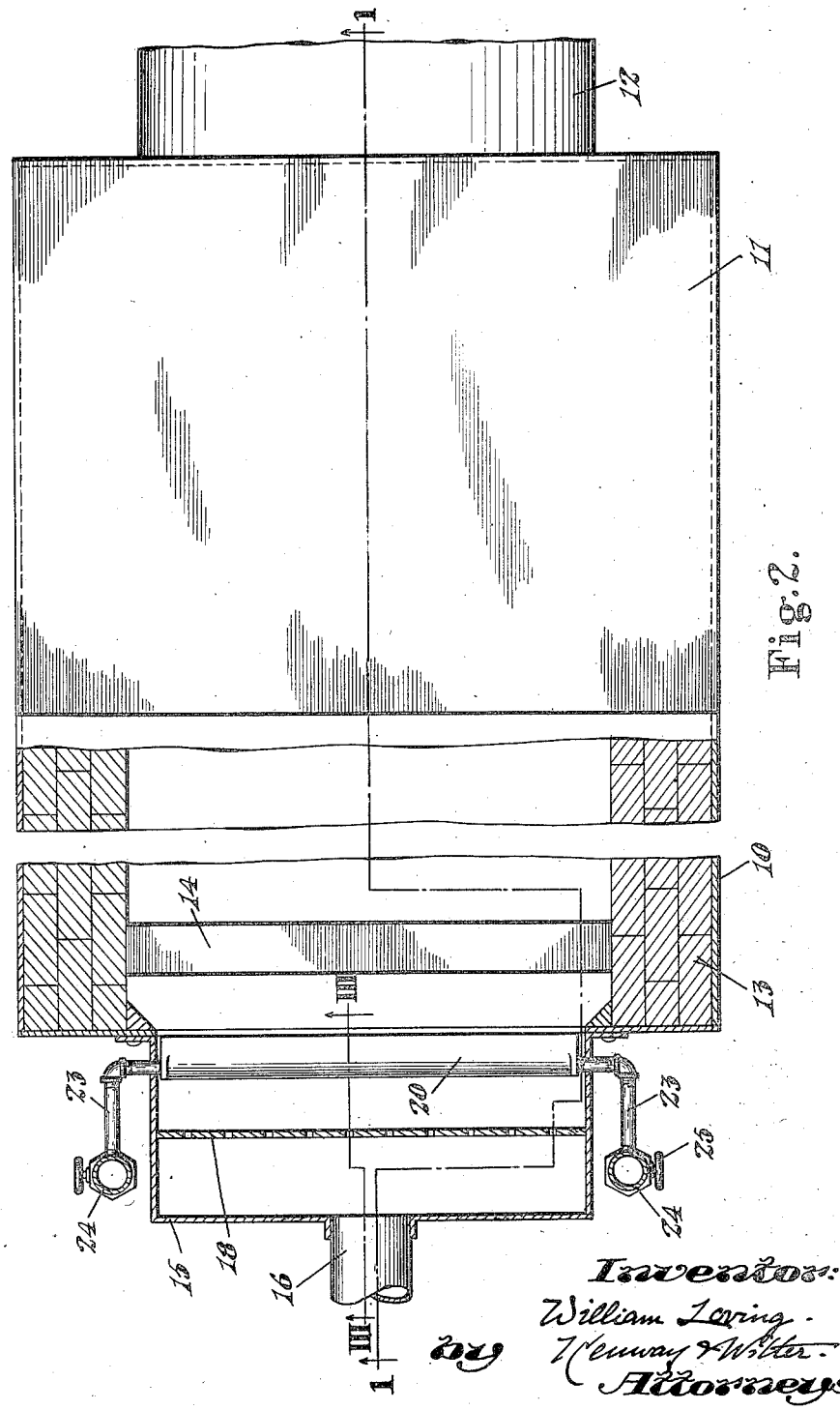

April 8, 1947. W. LOVING 2,418,475
APPARATUS FOR THE MANUFACTURE OF CARBON BLACK
Filed Jan. 8, 1943 3 Sheets-Sheet 1
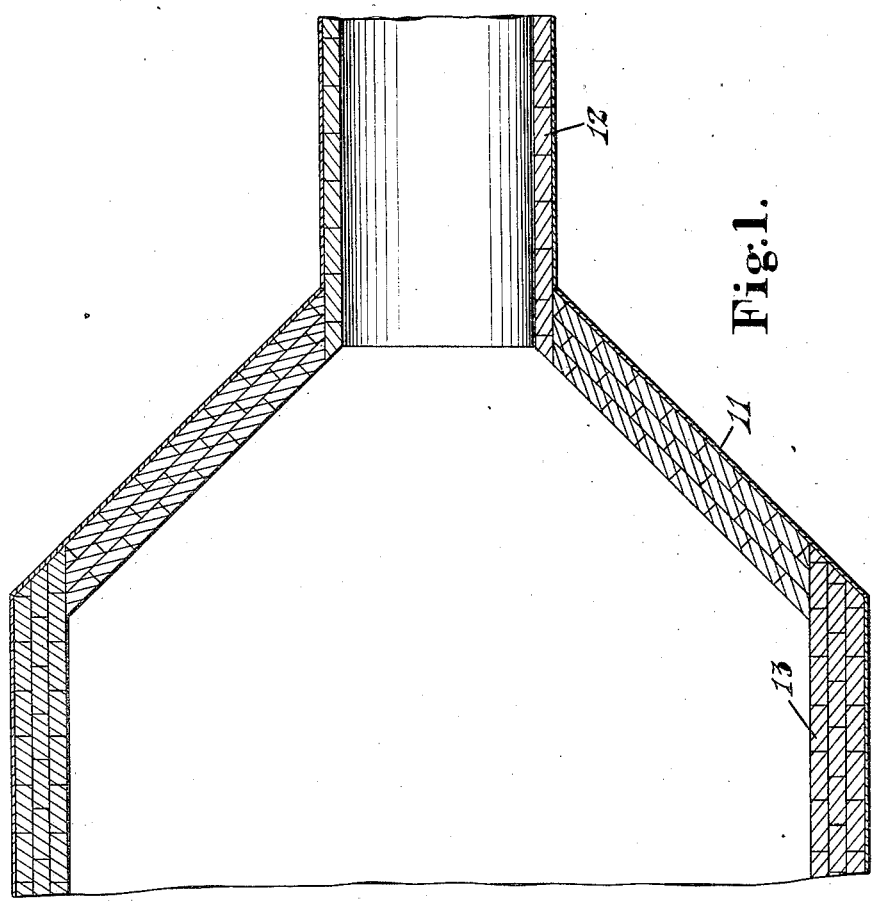
Fig.1.
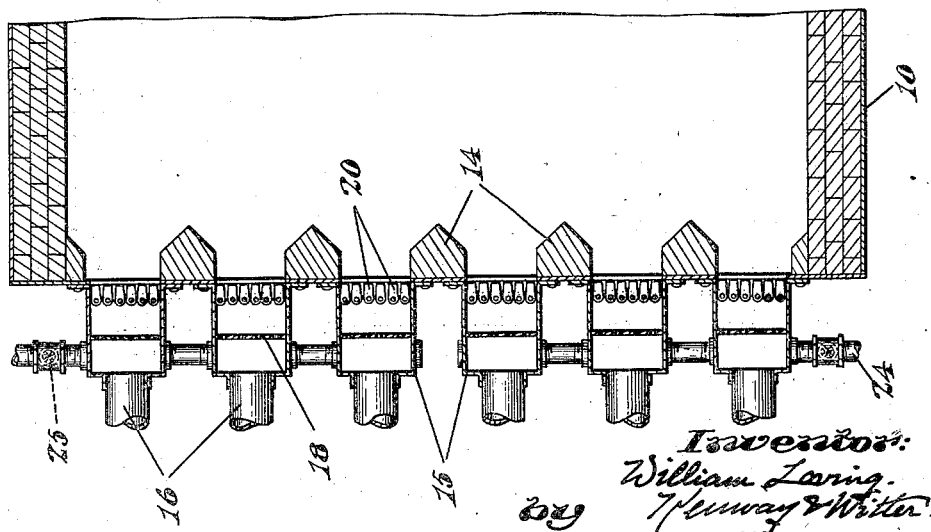
Inventor:
William Loving.
Kenway & Witter.
Attorneys April 8, 1947. W. LOVING 2,418,475
APPARATUS FOR THE MANUFACTURE OF CARBON BLACK
Filed Jan. 8, 1943 3 Sheets-Sheet 3

Inventor:
William Loving.

Patented Apr. 8, 1947

2,418,475

UNITED STATES PATENT OFFICE 2,418,475

APPARATUS FOR THE MANUFACTURE OF CARBON BLACK

William Loving, Pampa, Tex., assignor to Godfrey L. Cabot, Inc., Boston, Mass., a corporation of Massachusetts Application January 8, 1943, Serial No. 471,685

4 Claims. (Cl. 23—259.5)

This invention relates to the production of carbon black and consists in a new and improved furnace producing so-called "soft-black." It includes within its scope the novel process herein shown as carried out with the assistance of the furnace of my invention.

Soft black has been produced heretofore in furnaces of the general type disclosed in U. S. Reissue Letters Patent No. 16,765, Matlock, wherein natural gas and air have been supplied in regulated volumes to and burned in an enclosure of substantial capacity. Carbon black is formed by the incomplete combustion of natural gas in such enclosure and the unconsumed particles suspended in the products of combustion are then captured, separated and collected without being permitted to impinge or deposit upon adjacent hot or cold surfaces of the surface or its connection. This process is therefore to be distinguished from the "Thermatomic" process, on the one hand, where the carbon black is formed by passing the gas through heated checkerwork, and from the impingement process, on the other hand, where the carbon black is deposited by direct impingement of the flame against relatively cool surfaces.

The furnace of my invention is characterized, like that of the Matlock patent, by a large enclosed and unobstructed combustion space which in operation is completely filled with a formless turbulent swirling body of flame without form or method, except that it tends to progress slowly toward the outlet duct, at the rear end of the furnace enclosure.

As herein shown the furnace enclosure is elongated horizontally being provided in its rear end with a duct, through which the products of combustion and suspended carbon black are drawn off, and in its front wall with a series of burner boxes through which air and gas are admitted to the enclosure. I have found that it is advantageous in several respects to inject natural gas at higher velocity into a large, slow-moving body of air within the enclosure, preferably employing a multiplicity of small, well distributed gas inlet orifices and so breaking up the combustible air-gas mixture that there is no trace of laminar flow therein.

I have also found that favorable conditions for high yield of carbon black are realized when an immediate turbulence is created in the area in which the gas first enters the air.

To this end many features of the invention relate to the construction and arrangement of the burner boxes which are designed to produce gas distribution and turbulent combustion of the type described. In the first place, each burner box is designed as a complete self-contained unit of size convenient to be individually assembled and then incorporated in its place in the front wall of the furnace but outside the furnace enclosure or chamber. As herein shown each box comprises a rectangular metal casing, flanged for connection with the furnace and having a series of parallel burner pipes closely spaced within its open or flanged end. The individual burner pipes may be three feet or more in length and provided with rows of outlet orifices, for example, two rows of $5/32''$ holes drilled in parallel relation, or arranged so that the orifices diverge from each other. Each burner pipe is arranged to be supplied with a regulated amount of gas by any convenient connections. Air is supplied to the burner box at its outer wall by valve-controlled connections, is passed through a perforated baffle located behind the burner pipes, and thence passes forwardly into the furnace through the spaces provided for that purpose between the parallel burner pipes.

In order to secure good air distribution, it has been found advantageous to employ burner pipes of oval or pear shaped or other elongated cross section. In such a construction a spacing of about $1\frac{1}{2}''$ between the rows of inlet orifices in two adjacent burner pipes, or a spacing of about $\frac{1}{4}''$ between the thickest point of the adjacent burner pipes has been found very satisfactory in operation. If in such a furnace air is supplied at a ratio of 5:1 as compared to the supply of gas, the initial velocity of the gas into the combustion space will be over twice that of the air. Gas velocities of from 2 to 4 times the air velocity can be used advantageously in making various grades of black.

Figure 3:
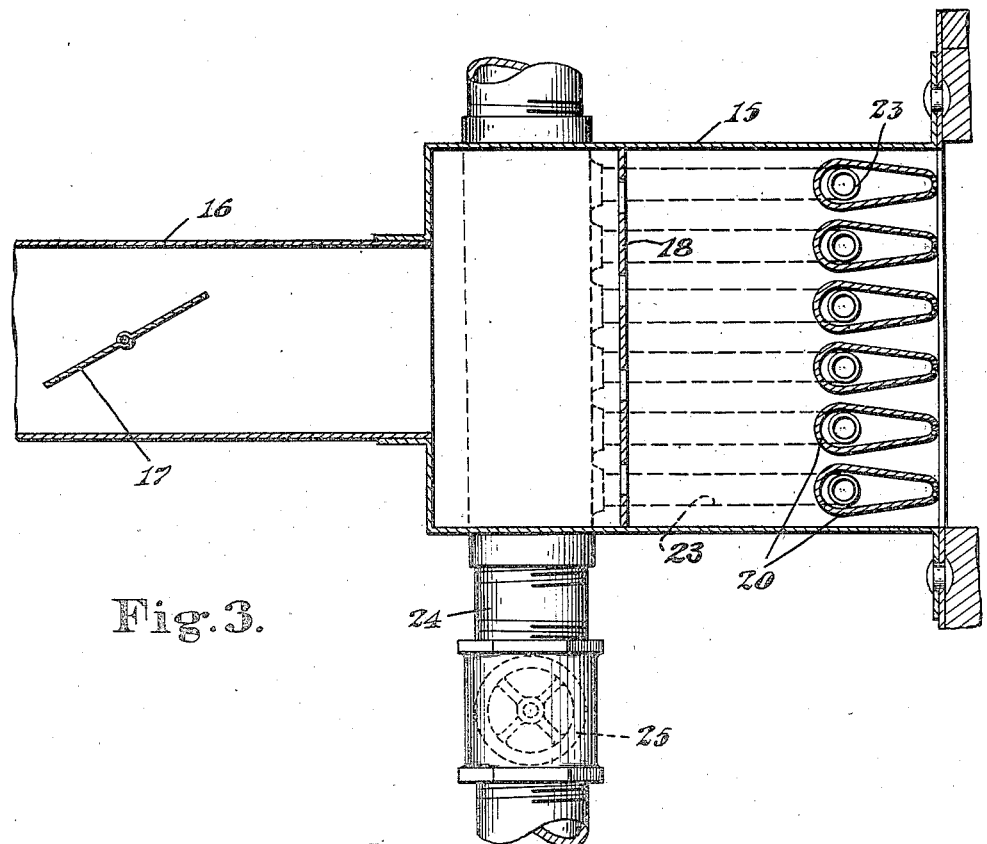
Figure 4:
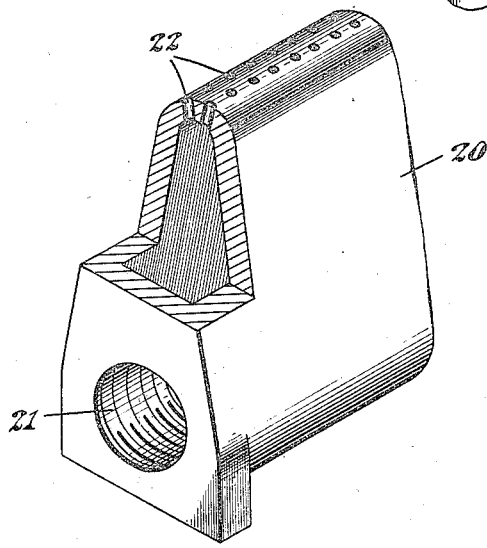

These and other features of the invention will be best understood and appreciated from the following description of a preferred embodiment thereof, selected for purposes of illustration and shown in the accompanying drawings in which, Fig. 1 is a view of the complete furnace in horizontal cross section, Fig. 2 is a corresponding view on a somewhat larger scale showing the furnace partly in side elevation and partly in vertical section, Fig. 3 is a view of one of the burner boxes in horizontal cross-section on an enlarged scale, and Fig. 4 is a fragmentary view in perspective of one of the burner pipes.

The rectangular body 10 of the furnace merges rearwardly into a converging section 11 and that, in turn, communicates at its rear end with a cylindrical outlet duct 12. The walls of the furnace are enclosed in a sheet steel casing and lined with refractory brick 13 and the outlet duct is also lined with a thinner layer of refractory brick. The front wall of the furnace is made up of alternate piers of refractory brick 14 and burner boxes 15 which are bolted in place between the piers to the casing of the wall of the furnace. In the illustrated furnace six burner boxes are shown, but the number thereof may be varied within the scope of the invention to include more or less than therein shown. It will be understood that the entire interior of the furnace comprises a free unobstructed combustion space which, for example, may be approximately 20 ft. long, 12 ft. wide and 3½ ft. high.

The construction of the individual burner boxes is best shown in Figs. 2 and 3. Each of these boxes comprises a rectangular casing of sheet metal, open at its front or furnace side and flanged so that it may be riveted or otherwise secured to the front wall of the furnace casing. The outer wall of each box is also apertured and flanged for the reception of an air inlet duct 16 which is herein shown as provided with an air valve 17 for regulating the amount of air supplied to its particular burner box. Within the casing is provided a vertical diaphragm 18 which divides the box into two compartments and is perforated so as to distribute uniformly to the burner pipes air admitted through the duct 16 to the space in the outer or rear end of the box.

The burner pipes 20 are preferably hollow integral castings, and may be substantially three feet long and oval or pear-shaped in cross section as best shown in Fig. 3. This cross section is advantageous in that it provides maximum gas capacity in burner pipes arranged with a spacing affording the requisite air passage area of most favorable shape. The pipes are herein shown as arranged vertically in parallel relation just within the open side of the casing 15 with their narrow end walls directed forwardly toward the furnace and their wider end walls directed rearwardly toward the diaphragm 18. The burner pipes are arranged with a definite predetermined spacing affording air passages of calculated dimensions between them. These individual passages converge abruptly to the line of maximum width of the burner pipes and then diverge more gradually toward the narrow perforated outlet walls of the pipes. In the pipes herein shown the line of maximum width is located about one-quarter of the distances from the wide rear wall of the burner pipe to its narrow front wall. In practice satisfactory results are secured by arranging the burner pipes with a spacing of approximately ¼" between their thickest portions.

The burner pipes are provided in their opposite flat end walls with tapped holes 21 for gas connections. These holes are disposed concentrically with respect to the wider curved wall of the pipes. In the narrow front wall of each burner pipe are drilled gas orifices or burner holes 22 as best shown in Fig. 4. These orifices may be parallel or disposed at any desired angle, but are herein shown as diverging forwardly and outwardly at an angle of approximately 20° to each other. The orifices may be of $\frac{5}{78}$" diameter, arranged with approximately ¼" to ½" spacing and when two rows are provided as herein shown each burner pipe may thus have 280 orifices. The multiplicity of small orifices and the greater velocity at which the gas enters the slow moving body of air has been found in practice to insure immediate and general turbulence in the air-gas mixture adjacent to the burner pipes and throughout the combustion space, and thus bring about an exceptionally complete mixing of the gas and air, eliminating all trace of laminar flow or of definite flame surfaces persisting in form for any detectable length of time. The gas is, in effect, injected from burner pipes located outside the furnace at higher velocity into a large body of air and from a multiplicity of small circular burner holes well distributed over the face of the furnace chamber. The continuity of the body of air is broken up by the multiplicity of jets establishing turbulence therein which in some cases may extend even slightly behind the burner pipes, that is, on the diaphragm side of the pipes.

Gas, usually natural gas, is supplied simultaneously to both ends of each burner pipe by pipe connections 23 which are shown as leading from gas headers 24, one arranged above and one below the row of burner boxes and both provided with regulating valves 25 by which the amount of gas delivered to the pipes may be regulated.

With the burner pipes arranged as shown and spaced 1.91 inches between their centers, and with two rows of $\frac{5}{32}$" gas orifices on ¼" centers along each pipe, the total gas inlet area in one lineal inch of the burner pipe amounts to .1534 sq. in. The gas from the jets in this lineal inch of burner pipe issues into a mass of air having a cross sectional area of 1.91 sq. in. less the area of the jets which is .1534, or 1.7566 sq. in. Consequently, if the volume of air used is five times the volume of the gas, the velocity of the gas in the jets is 2.3 times that of the surrounding air.

It has been found that a high ratio of perimeter to area of gas inlet orifice is advantageous in the furnace of my invention. Employing orifices of the dimensions above set forth results in a ratio of perimeter to area of 25.6:1 expressed in inches. In all cases I operate with a ratio of cross-sectional perimeter to cross-sectional area of above 10 to 1. If desired the orifices may be equipped with the lava tips well known to the industry, but in any case it is desirable to locate the burner bars themselves outside the combustion space of the furnace where they are not subjected directly to the intense heat of the flaming gas mixture.

It will be noted that the burner pipes herein shown are elongated in cross-section, approximately four times their greatest width and that the gas orifices in each pipe are located in its narrower wall which is directed toward the furnace enclosure. It is, of course, desirable to secure gas jets of substantially equal volume which are injected into the volume of enclosed air at a substantially uniform and higher velocity. It has been found that by elongating the gas pipes in cross section at least three times their width these desirable results are achieved. In referring to the gas orifices as being of small diameter I mean that their diameter is in the order of $\frac{5}{32}$ inch and not over ½ inch.

The furnace herein illustrated is elongated horizontally, but good results may be secured by the employment of a vertically elongated furnace enclosure and such an arrangement is within the contemplation of my invention.

The burner box herein disclosed is convenient and simple in structure as well as being easy to install in the field. In operation it maintains itself in good working condition, a characteristic which is very important because if the burner does not stay in good working condition the quality of the carbon black falls off and cannot be depended upon. As already noted, it is advantageous from the standpoint of yield. In addition to this, it is extremely versatile in use. By proper adjustment of gas and air it will produce carbon blacks having a range of color corresponding to the darkest channel rubber blacks up to that of the grayest medium thermal-blacks. This versatility of product is a characteristic not found in burners heretofore used.

Having thus disclosed my invention and described specifically the most satisfactory embodiment thereof now known to me, and the process carried out with its assistance, I claim as new and desire to secure by Letters Patent:

1. A burner box for use in combination with carbon black producing furnaces, comprising a rectangular sheet metal casing having an open side, and a series of parallel perforated burner pipes disposed entirely within the casing and adjacent to its open side, the pipes being substantially oval in both internal and external cross section, disposed with their flatter sides spaced from each other and their narrower sections outwardly directed and having a multiplicity of uniformly distributed small gas orifices in the outer section of each pipe, and means directing air from behind the burner pipes forwardly into the furnace in a substantially straight path through the spaces provided between the burner pipes.

2. In a burner box for use in combination with a carbon black producing furnace, a series of burner pipes arranged in adjacent parallel relation with air spaces between them, each being substantially pear-shaped in both internal and external cross section, the narrower section of each pipe being directed toward the furnace and having therein a multiplicity of spaced gas orifices approximately $\frac{5}{32}$ inch in diameter, and means directing air from behind the burner pipes forwardly into the furnace in a substantially straight path through the spaces provided between the burner pipes.

3. In a burner box for use in combination with a carbon black producing furnace, a series of burner pipes arranged vertically in adjacent parallel relation with air spaces between them, each pipe tapering forwardly and rearwardly in both internal and external cross section from a zone of maximum width located approximately one quarter of the distance from front to rear, each pipe having a wide rear section and a narrow front section and being perforated to provide a multiplicity of gas orifices in its narrow front section less than ½ inch in diameter, and means directing air from behind the burner pipes forwardly into the furnace in a substantially straight path passing through the spaces provided between the burner pipes.

4. In a burner box for use in combination with a carbon black producing furnace, a series of burner pipes arranged transversely of the furnace in parallel relation with air spaces between them, each pipe being elongated both in internal and external cross section at least three times its width thereby presenting wide side sections and relatively narrower front and rear sections, and having a row of small gas burner holes in its narrower front section, and means directing air from behind the burner pipes forwardly into the furnace in a substantially straight path passing through the spaces provided between the burner pipes.

WILLIAM LOVING.

REFERENCES CITED

The following references are of record in the file of this patent:

UNITED STATES PATENTS

| Number | Name | Date |
|---|---|---|
| 1,903,032 | Dufault | Mar. 28, 1933 |
| 1,950,015 | Winder et al. | Mar. 6, 1934 |
| 1,954,476 | Gloekler | Apr. 10, 1934 |
| 1,438,542 | Matlock | Dec. 12, 1922 |
| 2,144,971 | Heller | Jan. 24, 1939 |
| 1,902,753 | Beaver | Mar. 21, 1933 |
| 2,114,738 | Heller et al. | Apr. 19, 1938 |

Certificate of Correction

Patent No. 2,418,475.

April 8, 1947.

WILLIAM LOVING

It is hereby certified that error appears in the printed specification of the above numbered patent requiring correction as follows: Column 1, line 18, for the word "surface" read *furnace*; and that the said Letters Patent should be read with this correction therein that the same may conform to the record of the case in the Patent Office.

Signed and sealed this 20th day of May, A. D. 1947.

[SEAL]

LESLIE FRAZER,
*First Assistant Commissioner of Patents.*